United States Patent [19] [11] 3,970,054
Henault et al. [45] July 20, 1976

[54] INTERNAL COMBUSTION ENGINE FED WITH A STRATIFIED DOUBLE CHARGE

[75] Inventors: Claude Henault, Chevilly Larue; Pierre Cochard, Saint Germain les Arpajon, both of France

[73] Assignees: Regie Nationale des Usines Renault, Boulogne-Billancourt; Automobiles Peugeot, Paris, both of France

[22] Filed: Feb. 20, 1975

[21] Appl. No.: 551,415

[30] Foreign Application Priority Data
Feb. 21, 1974 France ............................. 74.06010
Sept. 17, 1974 France ............................. 74.31408

[52] U.S. Cl. ................................. 123/32 ST; 239/87; 123/DIG. 12; 123/32 SP
[51] Int. Cl.² ................... F02B 19/10; F02B 19/16
[58] Field of Search ......... 123/32 SP, 32 ST, 143 P, 123/191 S, 191 SP, 32 AE, DIG. 12; 239/87

[56] References Cited
UNITED STATES PATENTS

| | | | |
|---|---|---|---|
| 1,181,122 | 5/1916 | Eastman | 123/143 B |
| 1,664,612 | 4/1928 | French | 123/32 AE |
| 1,957,541 | 5/1934 | Johnson | 123/143 B |
| 2,829,631 | 4/1958 | Wilt | 123/32 AE |
| 2,937,634 | 5/1960 | Kelseaux | 123/DIG. 12 |
| 3,154,058 | 10/1964 | Warren | 123/32 ST |
| 3,608,529 | 9/1971 | Smith | 123/DIG. 12 |

*Primary Examiner*—Charles J. Myhre
*Assistant Examiner*—Ronald B. Cox
*Attorney, Agent, or Firm*—Haseltine, Lake & Waters

[57] ABSTRACT

An internal-combustion engine fed with a stratified charge and comprising an inlet leading into a combustion chamber for feeding thereinto a main charge of a lean mixture of a first fuel and air, and an injection device for injecting a second fuel into an ignition zone of the combustion chamber in an amount such that the mixture of the second fuel and the air contained in the lean mixture, in the ignition zone at the time of ignition, attains the level of the ignition richness of the second fuel. Thereby, the second fuel undergoes ignition and combustion and effects flame propagation to produce ignition of the first fuel. A holder with a ball valve protects the fuel injector of the injection device by obturating the injector at the end of the compression stroke and during ignition and the subsequent expansion stroke.

2 Claims, 6 Drawing Figures

INTERNAL COMBUSTION ENGINE FED WITH A STRATIFIED DOUBLE CHARGE

FIELD OF THE INVENTION

The present invention relates to an internal-combustion engine of the stratified-charge type, which uses two fuels, preferably hydrogen and a conventional liquid hydrocarbon.

BACKGROUND

A stratified charge fed inside an internal-combustion engine is a charge comprising at least one portion in which the fuel is at its "ignition richness". The "ignition richness" of a homogeneous air-fuel mixture at a given temperature is the fuel proportion allowing a flame to be propagated within the mixture, either by means of external energy (a spark plug, for example) or not.

Extensive research has already been made in the field of stratified-charge engines which use liquid or gaseous hydrocarbons and numerous solutions have been proposed although effective stratification of the charge has not yet been obtained. Effective stratification is obtained when a core having the proper ignition richness is formed about the point of ignition, the energy generated through combustion of this core being sufficient to ensure flame propagation in the remaining charge.

As far as liquid hydrocarbons are concerned, it is known that an air-fuel ratio of about 15/1 is the optimum ratio for obtaining ignition upon contact with a spark such as that generated by a conventional ignition system. It is also known that at a ratio of above 18/1 it becomes difficult to ignite this mixture other than by use of a live flame.

The use of a conventional air-fuel mixture requires a long preparation time due to three stages absolutely necessary for obtaining the ignition of the mixture, i.e.:
vaporization of the liquid fuel (however, it may be mixed in a fully atomized condition in some cases);
homogenization of the mixture;
temperature increase of the mixture (in such a way as to attain a temperature level sufficient to ensure flame propagation).

Since the preparation time is long with respect to the times imposed by the speed of rotation of the engines, a portion of charge having a richness level close to that of a stoichiometric mixture has to be added to a portion of the charge having a much lower richness level in a sufficiently short period to allow the three previously mentioned stages to take place. Under these conditions, it is very difficult to prevent the two charge portions —which must, of course, be in contact with one another in order that complete charge combustion may occur from mixing together to some extent. The mixture of the two charge portions, thus necessarily formed, decreases the richness of the rich portion of the charge and increases the richness of the lean portion, which is just the opposite of the stratification sought.

Moreover, it is known that difficulties due to poor vaporization and homogenization owing to lack of time arise in internal-combustion engines which are fed by direct injection into the cylinders.

Poor vaporization and homogenization are also responsible for major difficulties in "Diesel" engines which require injection to be carried out at pressures higher than 150 kg/cm$^2$ in order to atomize the fuel. Full-load conditions can never be fully attained for lack of homogenization.

SUMMARY OF THE INVENTION

The internal-combustion engine fed with stratified charge according to the present invention has a fuel system which avoids the disadvantages due to poor vaporization and homogenization of the charge in the known stratified-charge engines which use a liquid hydrocarbon as a fuel.

The stratified-charge engine according to the present invention has a main feed of a lean mixture of a first (usually liquid) fuel and air, and an independent injection into the ignition zone of a second (preferably gaseous) fuel which is at its ignition richness level upon being ignited.

A preferred gaseous fuel is hydrogen, which has the advantage not only that it is a gaseous fuel but that hydrogen-air mixtures ignite within a large concentration range (between 4% and 75% of fuel in the air). On the other hand, gaseous hydrogen in the presence of air maintains its own ignition properties whether or not it is in the presence of another fuel mixture.

Accordingly, with an air-hydrogen mixture having a concentration close to that of a stoichiometric mixture no risk exists of a decrease in concentration below the ignition concentration due to diffusion into the remaining charge fed to the engine.

An independent injection of hydrogen can then be carried out without substantial proportioning precautions, thereby obtaining a perfectly and wholly combustible mixture in the ignition zone within the combustion chamber, the ignition occurring owing to a supply of external energy or by self-ignition.

The repetition of the combustion cycles involves, however, the risk of resulting, in time, in damage to the injector in the injecting device which injects gaseous fuel, thereby reducing its reliability or causing it to become inoperative. It is thus advantageous to protect it during this stage by a temporary obturation means such as a ball valve. However, ball valves generally have a resilient means for the return movement of the ball to the closed or opened position, this resilient means usually being a helical spring and thus being likely to be affected by repeated thermal stresses due to the engine operation.

According to the invention, a remedy for the drawback just mentioned is to provide an injector independent of the injection device and mounted in an injector-carrying body having a ball valve, the ball of which is freely mounted with a given amount of clearance between a retaining element defining a fluid passage and located on the combustion chamber side, and a sealing seat on the injector side, so that the gas pressure within the combustion chamber at the end of the compression stroke before ignition and until the end of the expansion stroke urges the ball against this seat, thereby protecting the injector during these phases when extremely hot gases are in the combustion chamber.

According to a preferred embodiment of the invention, the ball seat is integral with the injector-carrying body; the retaining element is a baffle plate having two opposite flat portions defining the fluid passage, and it is pressure fitted by a cylindrical part thereof in a bore forming the seat for the ball against a shoulder formed in a ring not screwed into the injector-carrying body.

The invention will be described further, by way of example only, with reference to the accompanying drawings.

DETAILED DESCRIPTION

Figure 1:
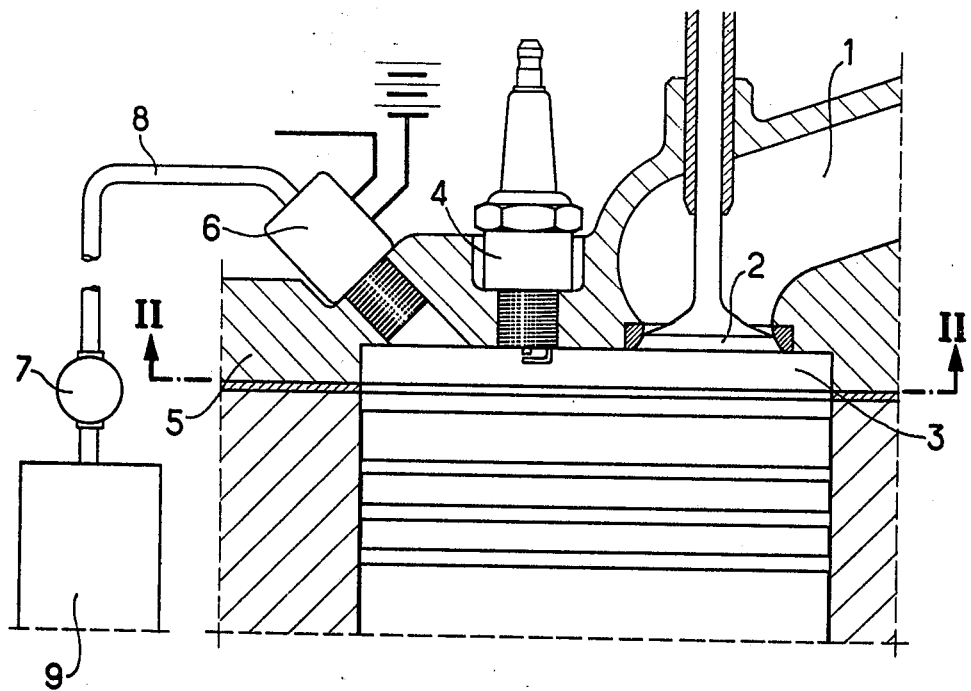
FIG. 1 is a cross-sectional view taken along line I—I in FIG. 2 showing the upper part of a combustion chamber of a first embodiment of a stratified-charge engine.

FIG. 1 shows a cross-sectional view of the upper part of an internal-combustion engine. An inlet conduit 1, which is closed by means of an inlet valve 2, is provided to supply the main charge of a liquid hydrocarbon-air mixture to the combustion chamber 3.

A spark plug is screwed into a cylinder head 5 to provide ignition.

An electromagnetic injector 6 is also screwed into the cylinder head 5 and leads into the combustion chamber 3. A valve 7 supplies the injector 6 with gaseous hydrogen via a conduit 8 from a source of hydrogen 9.

Figure 2:
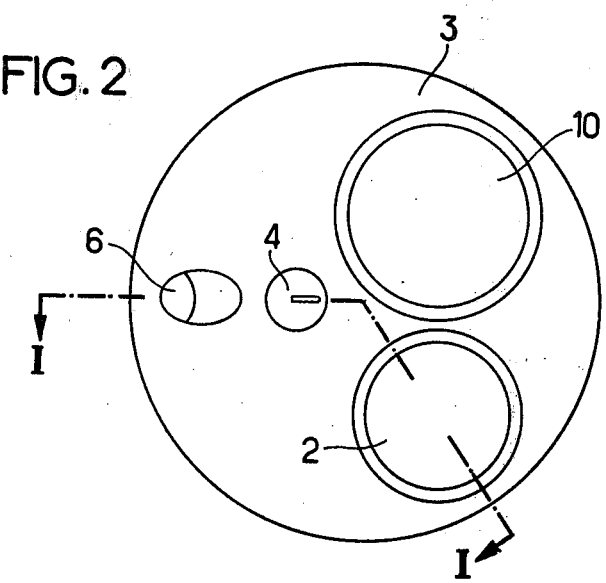
FIG. 2 is a view from below taken along line II—II in FIG. 1.

FIG. 2 is a diagrammatic view from below of the combustion chamber 3, and it shows the relative positions of the inlet valve 2, the spark plug 4, the hydrogen injector 5, and an exhaust valve 10.

Figure 3:
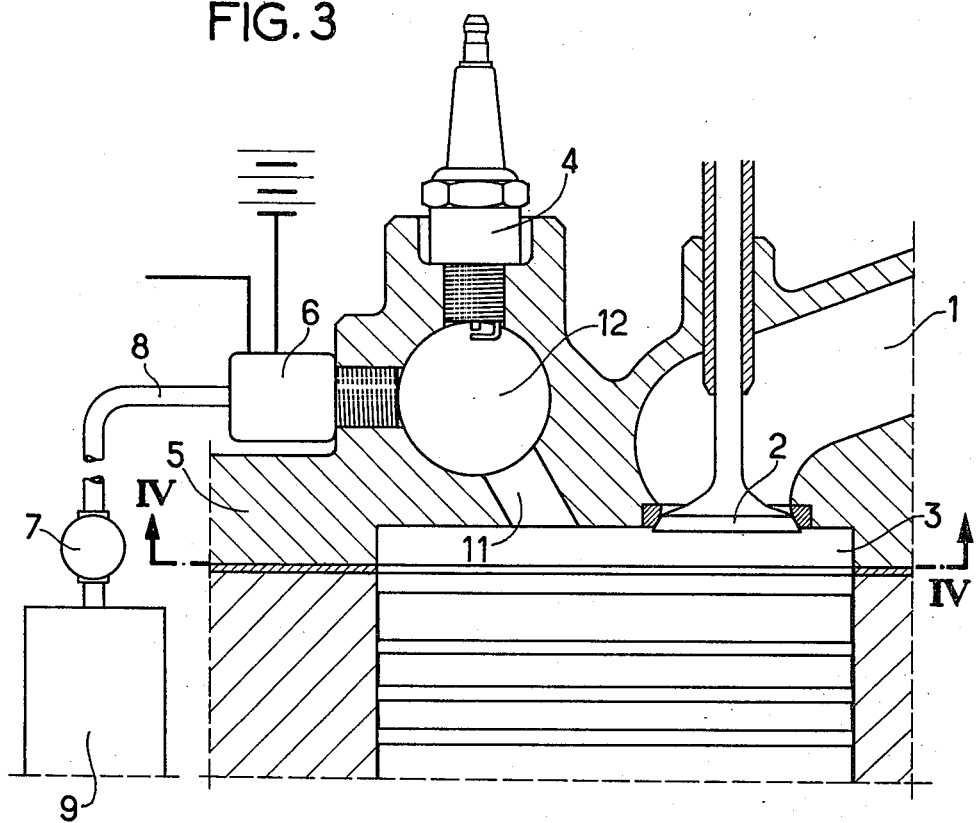
FIG. 3 is a cross-sectional view taken along line III—III in FIG. 4 showing the combustion chamber of a second embodiment of a stratified-charge engine.
Figure 4:
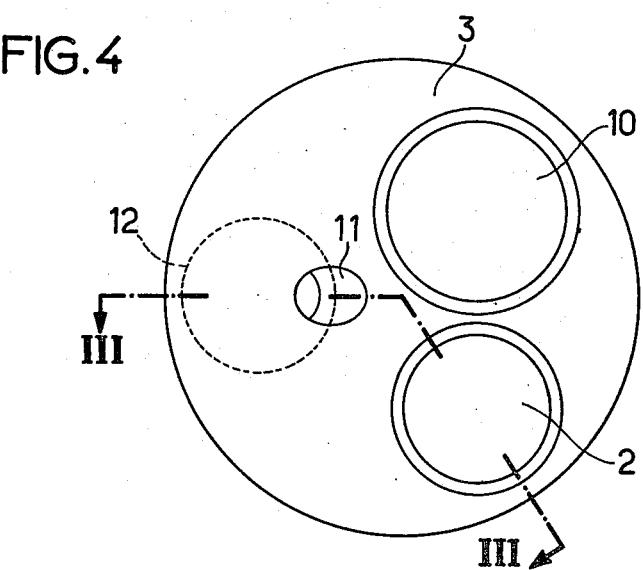
FIG. 4 is a view from below taken along line IV—IV in FIG. 3.

With reference to FIGS. 3 and 4, a channel 11 puts the main combustion chamber 3 into communication with a precombustion chamber 12. The ignition spark plug 4 and electromagnetically controlled injector 6 are mounted in this precombustion chamber 12.

In the above-described two embodiments of a stratified-charge engine, an air-liquid hydrocarbon mixture is supplied in a conventional manner, such as by means of a carburetor; this mixture is then fed to the inlet conduit 1 in a condition which is as homogeneous as possible and at a richness level lower than that of a stoichiometric mixture (in an air-fuel ratio of 22/1 for example). Atomization is obtained to some extent upon passage of the mixture through valve 2 before entering the cylinder.

When the compression stroke is substantially completed in the combustion chamber 3, a hydrogen charge is injected by the injector 6 in a region close to the spark plug 4, the injector 6 being supplied from the source 9 and being electromagnetically controlled.

When an ignition spark is generated, the hydrogen-air mixture near it is ignited and the combustion of this mixture ignites (owing to the energy thus generated) the standard lean hydrogen-air mixture in the remaining part of the combustion chamber.

The injected amount of hydrogen must be sufficient to obtain a hydrogen-air mixture near the ignition spark plug having a content of hydrogen of at least 10% by volume. This is the ignition richness value of hydrogen. It is sufficient to obtain a content of 10% by volume of the hydrogen in only 15% to 20% of the main change in order to ensure ignition and flame propagation in the remaining charge. Thus, the injected hydrogen mixes with a relatively small portion of the air and fuel of the main charge and attains its level of ignition richness.

For an engine of a unitary displacement of 0.5 litres, this is an amount of hydrogen of the order of 0.02 g, i.e. a very small quantity.

The internal-combustion engine illustrated in FIGS. 3 and 4 is a more sophisticated embodiment geometrically limiting the injection of hydrogen and ensuring ignition in precombustion chamber 12. The volume into which the hydrogen charge is injected is separated from the remainder of the charge in order to prevent substantial diffusion of hydrogen into the main charge and thus to avoid the consumption of too large a quantity of hydrogen.

This arrangement also enables the charge of hydrogen fed to the combustion chamber to be decreased.

The present invention, however, is not limited to the achievement of a minimum amount of hydrogen to be injected to ensure ignition of the whole charge, and of course it is possible to use all ignitable concentrations of hydrogen.

The flexibility of the use of hydrogen as a gaseous fuel allows either a fixed or a variable quantity of hydrogen to be injected depending on the speed and the load of the engine. In the case of variable injection, the electromagnetic control system of the injector 6 will be more complicated than in the case of uniform injection.

The two embodiments described above concern internal-combustion engines with controlled ignition, but the application of the invention is not limited to these engines. As a matter of fact, it is possible to produce internal-combustion engines according to the present invention ignited by compression effect. In the above-described embodiments, the ignition spark plug 4 will be then replaced by a conventional gas-oil injector for "Diesel" engines. The ignition will then occur due to the compression of the hydrogen charge.

Since hydrogen is easily inflammable even in small quantity, it is possible to cause combustion even at a relatively low compression rate. Cold starting of engines of "Diesel" type is thus facilitated. Heavier fuels can be used in these engines without affecting their efficiency.

Figure 6:
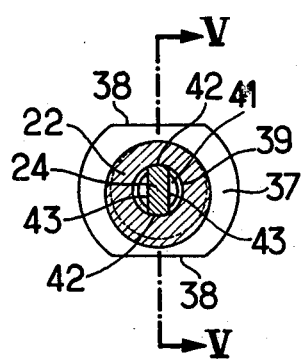
FIG. 6 is a transverse cross-sectional view taken along line VI—VI in FIG. 5.
Figure 5:
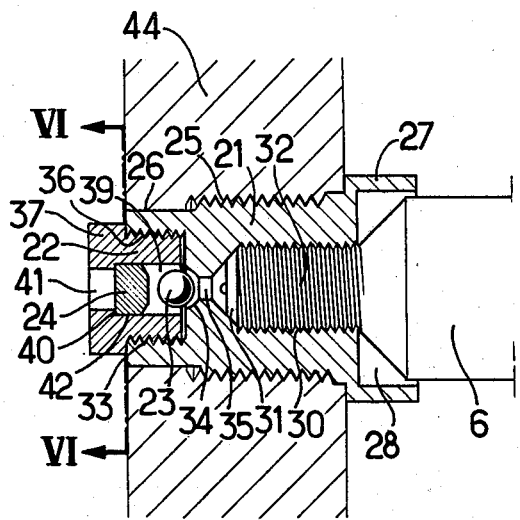
FIG. 5 is a longitudinal cross-sectional view of an injector holder taken along line V—V in FIG. 6.

In the above embodiments, it is preferable to include an injector holder such as that described hereafter in connection with FIGS. 5 and 6, in order to protect the injector 6.

The injector holder illustrated in FIGS. 5 and 6 comprises a body 21, a ring nut 22 screwed into the body 21, and a ball 23 free to move with some degree of axial and radial clearance within the injector holder, from which it is prevented from escaping by a retaining element 24 press-fitted in the ring nut 22.

The body 21, which is substantially cylindrical, has a threaded external portion 25 adapted to be screwed into side wall 44 of the combustion chamber, inside which the body 21 opens through a smooth guide portion 26. The body 21 also has a flange 27, and a smooth bore 28 which is designed to receive the injector 6 and which is prolonged by a threaded concentric portion 30 (terminating in a conical end 31) into which the end 32 of the injector 6 is to be screwed. At its opposite end, adjacent the combustion chamber, the body 21 has a second threaded bore 33, which is co-axial with the threaded bore 30 and receives the ring nut 22, the bore 33 extending to a conical portion 34 which forms a sealing seat for the ball 23 and communicates with the conical end 31 via an orifice 35 of small diameter.

The ring nut 22, also substantially cylindrical, has a threaded external portion 36 screwed into the threaded bore 33 in the body 21 and extending, on the combustion chamber side, to a flange 37 which forms an abutment for the ring nut 22, designed to rest against the body 21; the ring nut 22 has two flat portions 38 to facilitate its screwing into the body 21. The ring nut 22 has, on the injector side, a smooth bore 39 designed to serve as a free guide for the ball 23, which has a smaller diameter, bore 39 having an abutment 40 for the retaining element 24 and leading to the combustion chamber through a bore 41 of smaller diameter.

The retaining element 24 is constituted as a baffle plate which is press-fitted in cylindrical portion 42 in the bore 39 of the ring nut 22. The baffle plate has two flat opposite faces 43 defining fluid passages between the element 24 and the bore 39 in the ring nut 22. The ball 23 is thus seated with a certain degree of axial and radial clearance between its seat 34 and the retaining element 24.

The operation of the injector holder is an follows:

During the injection stroke, the flow from the injector 6 pushes the ball 23 against the retaining element 24 and fluid can then be freely injected into the combustion chamber through the peripheral clearance around the ball and the passages between the flat faces 43 and the bore 39.

Inversely, at the end of the compression stroke and during the explosion and the subsequent expansion stroke, the pressure of the gas in the combustion chamber pushes the ball 23 back against its seat 34 thereby protecting the injector 6 from detrimental thermal effects which would arise during the last two phases, particularly during the explosion phase. Protection of the injector 6 is thus more effective the more strongly the ball 23 is pushed against its seat 34, since the pressure becomes sufficient at the end of the compression stroke and thus before explosion, and remains sufficient to hold the ball against the seat until the end of the expansion stroke, i.e. as long as hot gases are in the combustion chamber.

The above described injector holder, by using an extremely simple means, which is reliable, of low cost price, and of automatic operation controlled by the cycle of operation of the engine, thus allows effective protection of the injection device against thermal stresses due to the repeated combustion phases in the engine.

What we claim is:

1. An internal-combustion engine fed with a stratified charge comprising means for injecting into a combustion chamber a main charge of a lean mixture of a first fuel and air, and an injection device, for injecting a second fuel into an ignition zone of the combustion chamber, comprising an injector holder and an injector mounted on said injector holder, said holder comprising a retaining element defining a fluid passage in said holder, a seat opposite said retaining element and a ball valve including a ball freely mounted with a given degree of clearance for movement between said retaining element and said seat, said retaining element being disposed in said holder closer to the combustion chamber, while said seat is integral with the holder and disposed closer to the injector such that the pressure in the combustion chamber at the end of the compression stroke and during ignition and the subsequent expansion stroke pushes the ball against its seat, thereby protecting the injector, with the retaining element being a baffle plate having two opposite flat lateral portions which define said fluid passage and said baffle plate being press-fitted in a bore in the injector holder.

2. An internal-combustion engine as claimed in claim 1, wherein said injector holder comprises a body and a ring nut screwed into said body, said ring nut being provided with said bore into which said baffle plate is press-fitted.

* * * * *